No. 788,463.

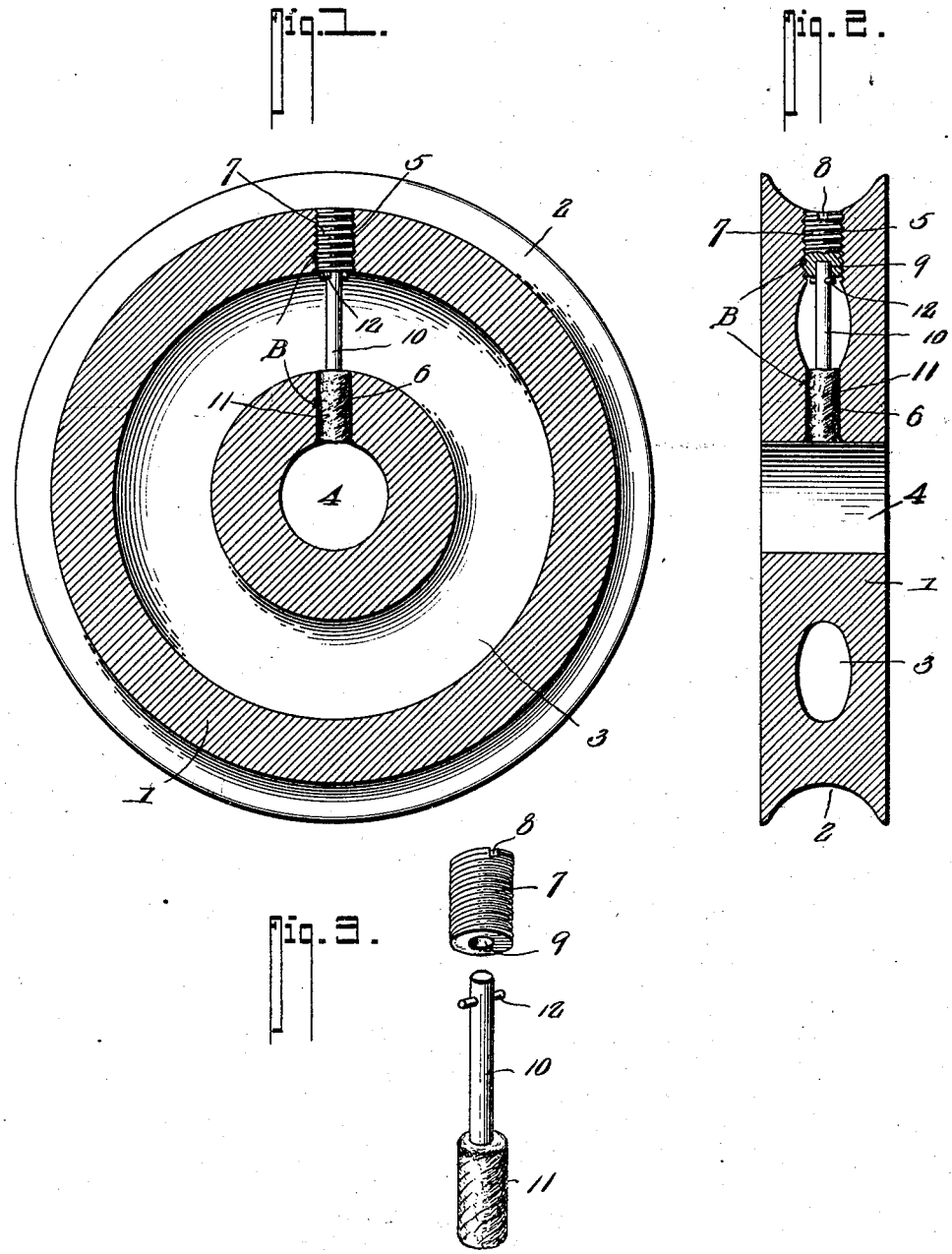

Patented April 25, 1905.

UNITED STATES PATENT OFFICE.

JOHN EBENEZER GILCHRIST, OF SOUTHBEND, WASHINGTON.

SELF-LUBRICATING SHEAVE.

SPECIFICATION forming part of Letters Patent No. 788,463, dated April 25, 1905.

Application filed November 15, 1904. Serial No. 232,875.

*To all whom it may concern:*

Be it known that I, JOHN EBENEZER GILCHRIST, a citizen of the United States, residing at Southbend, in the county of Pacific and State of Washington, have invented a new and useful Self-Lubricating Sheave, of which the following is a specification.

This invention relates to self-lubricating sheaves for various purposes.

The object of the invention is to provide for the automatic flow of lubricating material slowly, but steadily and evenly, from a lubricating-chamber in the sheave to the bearing of the latter.

With this and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention.

In said drawings, Figure 1 is a vertical sectional view of a self-lubricating sheave embodying the principles of the invention. Fig. 2 is a transverse sectional view of the same. Fig. 3 is a perspective detail view showing the parts comprising the lubricating device detached from the sheave.

Corresponding parts in the several figures are indicated by like characters of reference.

The invention has been shown as applied to an ordinary sheave 1, made of cast-iron or other suitable material and which is provided with a peripheral groove 2. Said sheave is cored to form an interior annular chamber 3, which constitutes the receptacle for oil or lubricating materials. The sheave is provided with a transverse aperture 4, whereby it may be mounted for rotation upon a pin or shaft. (Not shown.)

The sheave 1 is provided with a radial bore or aperture extending from the peripheral groove 2 to the transverse aperture 4. This bore, which as an entirety is designated B, is composed of an outer section 5, connecting the peripheral groove 2 with the oil-chamber 3, and an inner section 6, which connects the oil-chamber with the transverse aperture 4. The outer section 5 of the bore is interiorly threaded for the reception of a plug 7, having at its outer end a nick or notch 8, which may be engaged by a screw-driver for the purpose of adjusting said plug. The inner end of the plug is provided with a recess 9.

10 designates a rod or wire upon one end of which is wound a quantity of cotton wicking 11 or other suitable material adapted to fit in the inner end or section 6 of the bore. Near its outer end the rod or wire 10 is provided with a small transverse pin 12. The outer extremity of the rod 10 is adapted to engage the recess 9 in the plug 7; but said recess may be dispensed with and the inner end of the plug may be caused to bear directly upon the outer end of the rod 10.

The operation of this invention will be readily understood from the foregoing description taken in connection with the drawings hereto annexed. When the plug 7 is removed from the sheave, oil or lubricating material may be readily introduced into the chamber 3, where it is confined by restoring the plug 7. From the compartment 3 the oil will percolate through the wicking 11 to the bearing, which will thus be slowly but constantly and steadily lubricated. The plug 7 may be utilized to push the rod 10 in an inward direction until the wicking contacts with the bearing-pin. Should it be desired to remove the rod and wicking 10 11, this may be accomplished by first removing the plug 7 from the sheave and then employing a hooked wire or other implement to catch under the transverse pin 12, when the rod 10 may be readily withdrawn.

Having thus described the invention, what is claimed is—

1. A sheave having an annular oil-chamber, a transverse aperture, and a radial bore extending from said aperture to the periphery of the sheave, a rod having a winding of porous material engaging the section of the bore between the oil-chamber and the transverse aperture, and a screw-threaded plug engaging the section of the bore between the oil-chamber and the periphery of the sheave, said plug bearing against the outer end of said rod.

2. A sheave having an annular oil-chamber, a transverse aperture, and a radial bore extending from said aperture to the periphery of the sheave and intersecting the oil-chamber, a rod having a winding of porous material engaging the inner end of the bore, and a threaded plug mounted in the outer end of the bore and having a recess at its inner end engaging the outer end of the rod.

3. A sheave having an annular oil-chamber, a transverse aperture and a radial bore intersecting said oil-chamber, a rod having a winding of porous material engaging the inner end of the bore, a pin extending transversely through said rod, near the outer end of the latter, and a closure for the outer end of the bore.

In testimony that I claim the foregoing as my own I have hereto affixed my signature in the presence of two witnesses.

JOHN EBENEZER GILCHRIST.

Witnesses:
C. S. CORY,
H. A. HILL.